US006735677B1

(12) United States Patent
Stewart

(10) Patent No.: US 6,735,677 B1
(45) Date of Patent: May 11, 2004

(54) PARAMETERIZABLE QUEUED MEMORY ACCESS SYSTEM

(75) Inventor: Charles H. Stewart, Richardson, TX (US)

(73) Assignee: LSI Logic Corporation, Milpitas, CA (US)

( * ) Notice: Subject to any disclaimer, the term of this patent is extended or adjusted under 35 U.S.C. 154(b) by 133 days.

(21) Appl. No.: 09/847,848

(22) Filed: Apr. 30, 2001

(51) Int. Cl.[7] ............................................. G06F 13/18
(52) U.S. Cl. ..................................... 711/158; 711/151
(58) Field of Search ................................ 711/104, 147, 711/151, 156, 158

(56) References Cited

U.S. PATENT DOCUMENTS

| | | | |
|---|---|---|---|
| 4,682,284 A | | 7/1987 | Schrofer |
| 5,701,434 A | * | 12/1997 | Nakagawa ................... 711/157 |
| 5,835,741 A | * | 11/1998 | Elkhoury et al. ........... 710/310 |
| 6,058,461 A | * | 5/2000 | Lewchuk et al. ........... 711/158 |
| 6,295,586 B1 | * | 9/2001 | Novak et al. ................ 711/154 |
| 6,311,257 B1 | * | 10/2001 | Fitzgerald et al. .......... 711/170 |
| 6,393,531 B1 | * | 5/2002 | Novak et al. |
| 6,490,661 B1 | * | 12/2002 | Keller et al. ................. 711/150 |
| 6,532,505 B1 | * | 3/2003 | Stracovsky et al. ........... 710/63 |
| 6,564,304 B1 | * | 5/2003 | Van Hook et al. .......... 711/154 |
| 6,622,225 B1 | * | 9/2003 | Kessler et al. ............... 711/158 |
| 2002/0078163 A1 | * | 6/2002 | Gregg ......................... 709/216 |

* cited by examiner

Primary Examiner—Matthew Kim
Assistant Examiner—Woo H. Choi
(74) Attorney, Agent, or Firm—Conley Rose, P.C.

(57) ABSTRACT

A unique memory access system and method to handle memory access requests to a memory shared by multiple independent data access devices ("IDADs"). More particularly, the present invention relates to a method and system that allows IDADs to efficiently execute memory access requests without having to wait for the shared memory to be available. In addition, the IDADs do not have to be designed to observe the specific memory protocol. The memory access requests from the IDADs are accepted by access request logic which then queues the requests. Memory access logic then executes the requests from the queue when the shared memory is available. The memory access logic places data obtained from read requests in a read buffer for the IDADs to access when convenient.

35 Claims, 4 Drawing Sheets

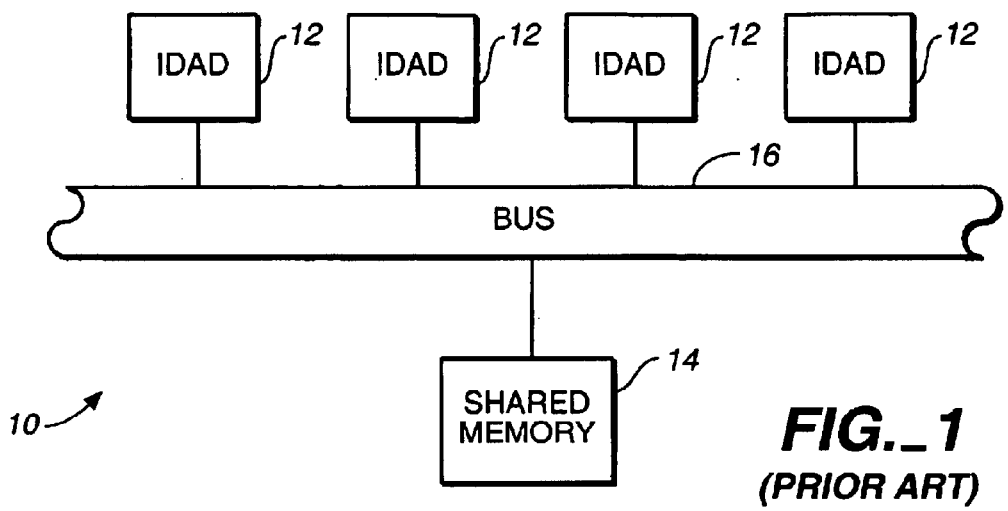
FIG._1
(PRIOR ART)
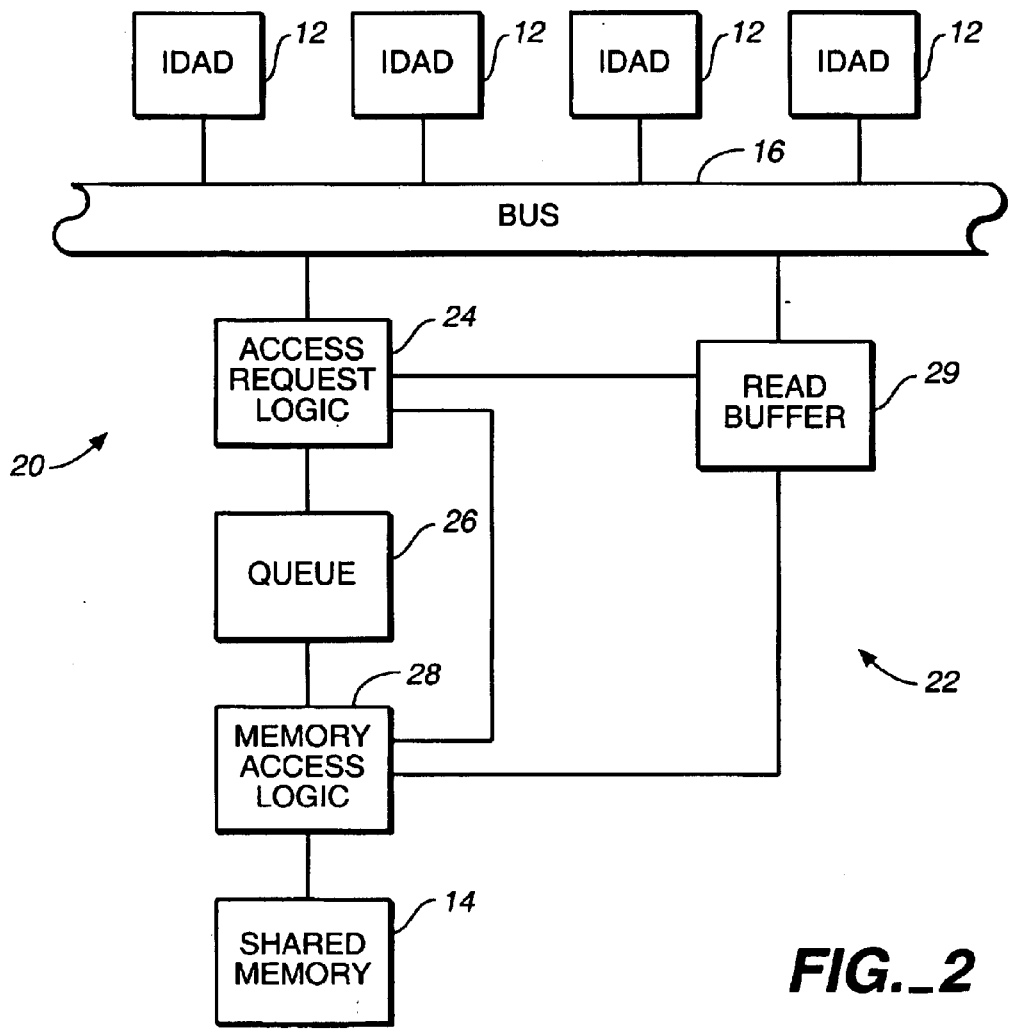
FIG._2

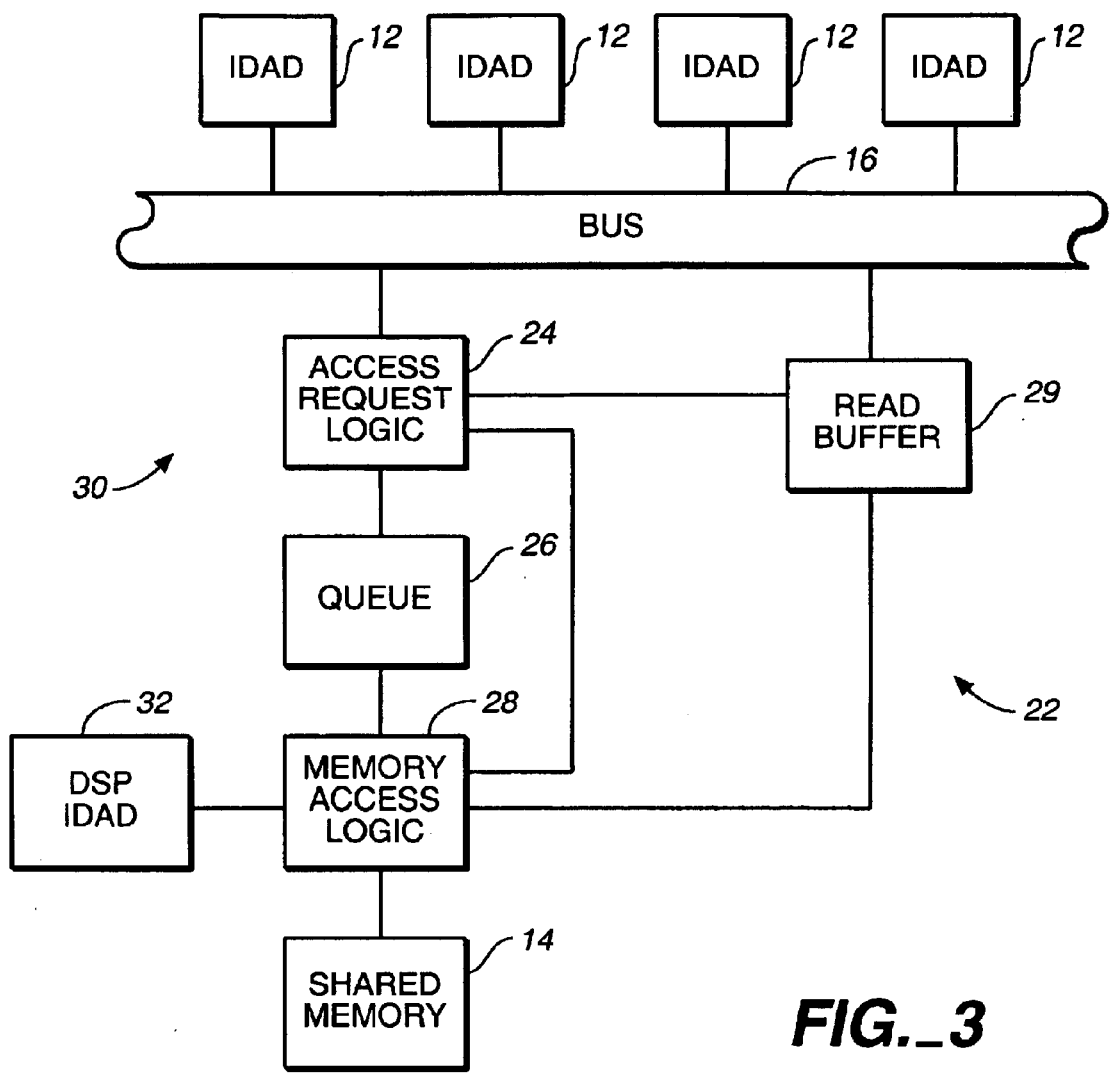
FIG._3

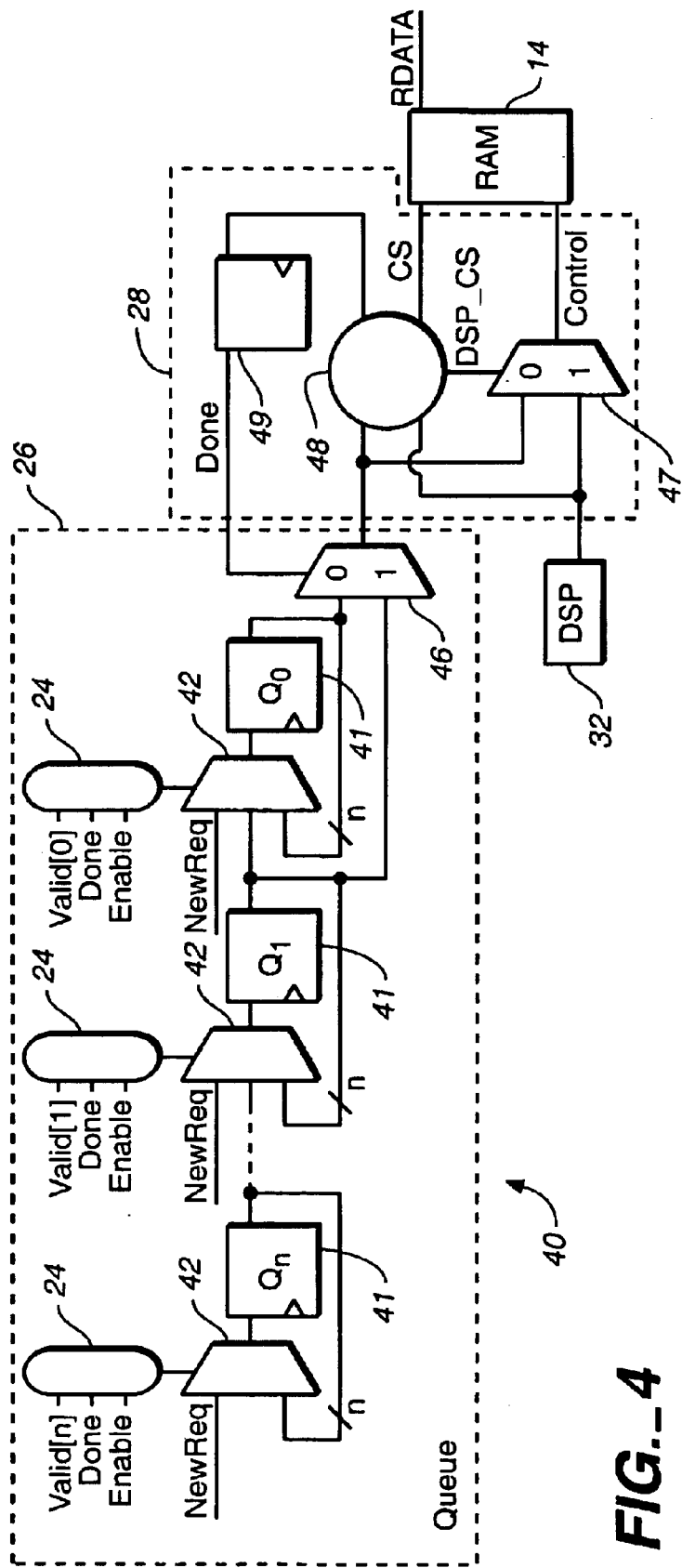
FIG._4

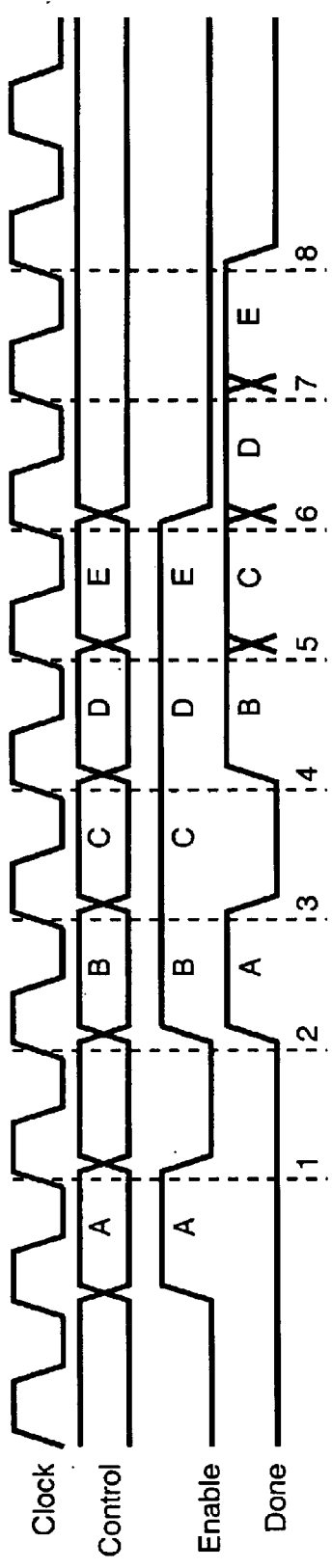
FIG._5
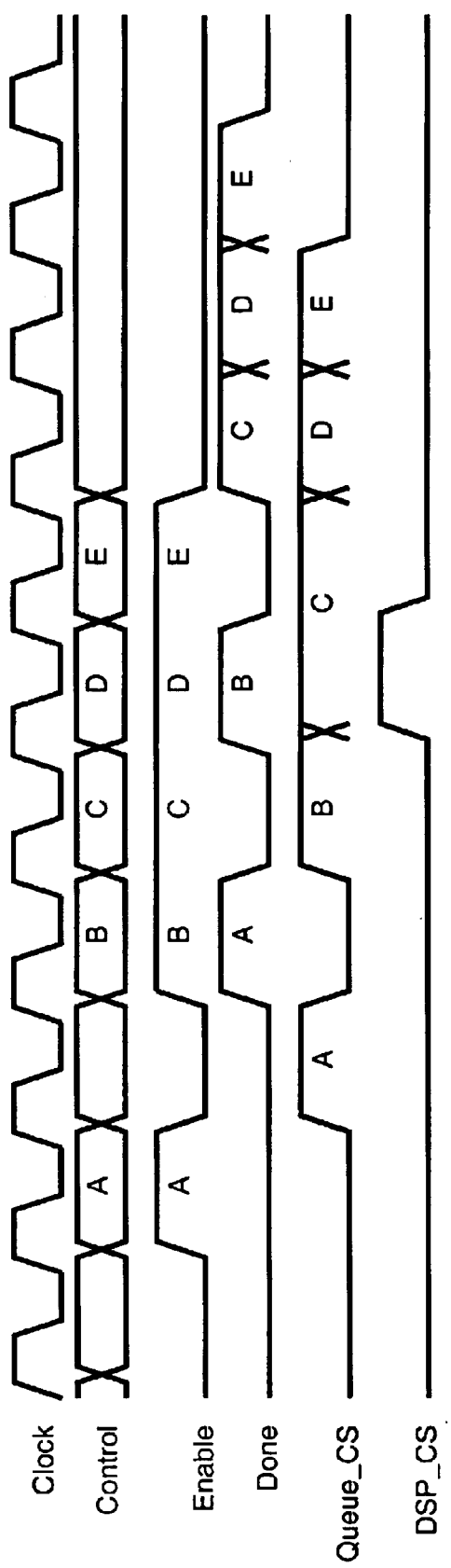
FIG._6

PARAMETERIZABLE QUEUED MEMORY ACCESS SYSTEM

CROSS-REFERENCE TO RELATED APPLICATIONS

This application incorporates by reference for all purposes, the following applications, filed on the same date as this application and assigned to the same assignee as the present application:

U.S. patent application Ser. No. 9/847,849, entitled "Bridge For Coupling Digital Signal Processor to AMBA Bus as Master", filed Apr. 30, 2001 by inventors Charles H. Stewart and Keith D. Dang; and U.S. patent application Ser. No. 09/847,850, entitled "Bridge For Coupling Digital Signal Processor to AMBA Bus as Slave", filed Apr. 30, 2001 by inventor Charles H. Stewart.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to a memory access system and method to share memory resources between multiple devices in a microprocessor system. More particularly, the invention relates to a memory access system and method to queue memory requests from independent data access devices (herein "IDADs") and to execute those queued requests in memory.

2. Background of the Invention

In many microprocessor-based systems, the system memory is a main resource shared by many of the system's devices, including the processor core. For example, a typical system may incorporate multiple processor cores (such as digital signal processors, herein "DSPs"), as well as digital memory access controllers (herein "DMAs"), port interface controllers, etc., all of which may require access to the system memory. Any device requiring access to the system's memory will be referred to collectively herein as an independent data access device, or "IDAD."

Since the IDADs may be performing operations independently from one another in the system, more than one IDAD may seek access to the memory at the same time. Such conflicting demands for the same memory resource have been handled in various ways. For example, a priority system may be established giving certain system devices priority access to the memory over other devices. For instance, the IDADs may be serviced in a round robin format where each IDAD has priority on a rotating basis; or certain IDADs may be given fixed priority over other IDADs (i.e., a processor core may be given priority over all other IDADs so that the processor core will not be delayed), etc. In these systems, an IDAD may be forced to wait for access to the memory while another IDAD, perhaps with greater priority, is accessing the memory. Causing an IDAD to wait for access to the memory may delay the IDAD from performing other operations thereby reducing the IDAD's performance. For instance, in many systems the IDAD must continue to assert the access request (a read or a write) until it can be completed at the memory. Thus, such an IDAD must wait to assert new access requests until previous ones have finished. As a result, the IDAD may be stalled indefinitely while awaiting access to the shared memory. If the IDAD is performing a function required by the system as a whole, such delays could negatively affect the overall system performance.

Another issue in these systems is that each IDAD interfaces directly with the memory. As a result, each IDAD must implement the exact protocol used by the memory so the interface to the IDAD and the memory will work correctly. Often times, memory has relatively stringent timing requirements, data/address formatting requirements, etc., so this may significantly complicate the design of the IDADs.

Moreover, since each IDAD is designed to interface directly with the shared memory, if the memory is ever changed, each IDAD would have to be redesigned to accommodate the different memory protocol. This makes the system inflexible since any change in memory would potentially require each IDAD to be redesigned to observe the memory's timing requirements, address/data formatting, and other protocol required to access the new memory.

For all of the foregoing reasons, these shared memory systems may often be relatively inefficient, complicated to design, and somewhat inflexible.

BRIEF SUMMARY OF THE INVENTION

In accordance with the present invention, there is provided a novel method and system for efficiently connecting IDADs to a shared memory to reduce delays, while isolating the IDADs from the memory so each IDAD is not required to implement the exact protocol used by the memory. In particular, a parameterizable queued memory access system is provided wherein a programmable number of access requests can be accepted into a queue structure using a relatively simple interface protocol to the IDADs. The memory access system accepts access requests into the queue from the IDADs and executes them at the shared memory. Since the memory access system handles execution of the requests in memory, the IDAD is free to continue its operations after its memory access request has been queued, thereby enhancing the efficiency of the IDAD. For write requests, once the memory is accessed, the process is complete and the request is done. For read requests, once the memory is accessed, the data read from memory is placed in a read buffer for the IDAD to retrieve at its convenience. The memory access system handles the timing and protocol required for the shared memory; therefore, the design of each IDAD is simplified since it no longer has to observe the strict memory protocol. In addition, a change in memory protocol no longer requires changing the IDADs.

BRIEF DESCRIPTION OF THE DRAWINGS

The invention can be more fully understood by referencing the accompanying drawings wherein:

FIG. 1 shows a system diagram of an example system having multiple IDADs utilizing shared memory prior to the present invention;

FIG. 2 shows a system diagram of a system having multiple IDADs utilizing shared memory with a memory access system as contemplated by the present invention;

FIG. 3 shows a system diagram of a specific embodiment of the queued memory access system of the present invention;

FIG. 4 shows more detail of the queue and memory structure of the specific embodiment of the present invention contemplated in FIG. 3;

FIG. 5 shows a timing diagram illustrating the behavior of system signals during execution of several access requests and access completions as contemplated by the present invention; and FIG. 6 shows a timing diagram illustrating the behavior of system signals during execution of several access requests and access completions for the embodiment of the present invention as contemplated in FIG. 4.

NOTATION AND NOMENCLATURE

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term computer system is used broadly herein to include any microprocessor-based system or platform.

DETAILED DESCRIPTION OF THE DRAWINGS

Referring now to the drawings, wherein like reference characters denote corresponding components or parts:

FIG. 1 shows a system diagram of an example system 10 having multiple IDADs 12 utilizing shared memory 14, typical prior to the present invention. As shown in FIG. 1, the example system 10 utilizes a bus 16 to couple the memory access requests from the IDADs 12 to the shared memory 14. Alternatively, the system 10 could be configured where the memory access requests from the IDADs 12 might be directly coupled to the shared memory 14. In either case, it is understood that the IDADs 12 in system 10 observe the specific memory interface protocol demanded by the shared memory 14. In particular, the IDADs issue their memory access requests (reads and writes) observing the memory's timing requirements, address/data formatting, and other protocol required to successfully access the memory.

In the system 10, multiple IDADs 12 may attempt to access the shared memory 14 at the same time, i.e., multiple IDADs may require memory access requests at the same time. The system 10 has no means to service multiple IDADs 12 at the same time. Accordingly, the access requests from the IDADs 12 must be prioritized to be handled one at a time, or several at a time but still serially, depending on the capability of the memory to handle multiple access requests. Various methods of prioritizing the memory access requests have been attempted, including: prioritizing based on the type of IDAD 12, simply rotating the priority between the various IDADs 12, etc. Specifically, the IDADs 12 may be serviced in a round robin format where each IDAD 12 has priority on a rotating basis; or certain IDADs 12 may be given fixed priority over other IDADs 12 (for example, a processor core may be given priority over all other IDADs so that the processor core will not be delayed). Where the IDAD 12 requires the memory access request to be performed before it can continue its operation, an IDAD 12 may be stalled while it awaits access to the memory 14. Take for example a processor IDAD 12 which executes instructions in order, the processor cannot continue with other operations until the memory access (read or write) is completed. In addition, some IDADs 12 may require multiple cycles to prepare the next access request. If such an IDAD 12 must wait for the current access to be complete before it can begin preparing the next access request, unwanted wait cycles may be created in the IDAD 12. Obviously, these circumstances may negatively impact the IDADs 12 performance as well as potentially the overall system 10 performance.

It should also be noted that a change in the memory 14 of the system 10 would potentially necessitate a change in each and every IDAD 12 for the system 10 to still be operational. Since each IDAD 12 interfaces directly with memory 14, the memory access requests must observe the required memory protocol. If the required memory protocol is changed, for instance by changing the type of memory 14, then each IDAD 12 would have to be redesigned to handle the new protocol.

FIG. 2 shows a system diagram of a system 20 having multiple IDADs 12 utilizing shared memory 14 similar to the system 10 shown in FIG. 1 only with the addition of a memory access system 22 as contemplated by the present invention. The system 20 shown in FIG. 2 is similar to the system of FIG. 1 in that the IDADs 12 are coupled to a bus 16 to communicate with the shared memory 14. Again, however, the bus 16 is not required and the IDADs might be coupled without a bus.

In the system 20 of FIG. 2, however, the bus 16 is not coupled directly to the shared memory 14. Instead, access request logic 24 is coupled to the bus 16. The memory access requests of the IDADs 12 are taken from the bus 16 by the access request logic 24. The access request logic 24 then places the memory access requests in a queue 26.

Memory access logic 28 is coupled to the queue 26 and the shared memory 14. The memory access logic 28 takes memory access requests from the queue 26 and executes them in the shared memory 14. Accordingly, the memory access logic 28 handles the required memory protocol necessary to access the memory 14. The memory access logic 28 is also coupled to the access request logic 24 to return a complete or Done signal to indicate that the queued request has been successfully executed.

If the memory access request taken from the queue 26 is a write request, the memory access logic 28 executes the write transaction in the shared memory 14. Upon completion of the write transaction, the write request has been removed from the queue 26, freeing space in the queue for an additional access request to be queued, and the shared memory 14 has been updated based on the write request. For a write request, both the data which is to be written as well as the address of the location where the data is to be written must be queued so the memory access logic 28 has sufficient information to perform the write operation. By queuing the write requests, the IDADs 12 can take advantage of "write-posting." The term "write-posting" is used to reference the situation where an IDAD 12 can simply assert a write request to the queue 26 ("post a write") and immediately continue its operation without having to wait for access to the memory, which may be unavailable at the time the IDAD 12 asserts the request. Assuming there is available space in the queue 26, the IDAD 12 can post a write immediately (i.e., in a clock cycle) and then rely on the queue 26 to execute the write request when memory is available. This allows the IDAD 12 to post the write to the queue 12 and then immediately continue its other operations.

If the memory access request taken from the queue 26 is a read request, the memory access logic 28 executes the read transaction in the shared memory 14. The memory access logic 28 then places the data read from the shared memory 14 in the read buffer 29. The read buffer 29 is coupled to the memory access logic 28 and the bus 16. The read buffer 29 maintains the data read from memory so the requesting IDAD 12 can read the data via the bus 16 at the IDAD's 12 convenience. Thus, upon completion of the read transaction, the read request has been removed from the queue 26, freeing space in the queue for an additional access request to be queued, and the read buffer 29 has been updated based on the contents of the shared memory 14 which have been read. Once an IDAD 12 has retrieved the data from the read buffer 29, the data is deleted from the read buffer 29 to free space in the buffer for additional data from following read requests. For a read request, only the address of the location where the data is to be read must be queued so the memory access logic 28 has sufficient information to perform the read operation.

By implementing more sophisticated memory access logic 28, pre-fetching can be accommodated. That is, the memory access logic 28 can be designed to allow reads from memory which include data not just from the address of the specific read request, but also from surrounding or related addresses. Since adjacent (or otherwise related) data in memory is often accessed contemporaneously, system performance can be enhanced by anticipating the need for this data. Thus, by reading data from addresses related to the address of the specific read request, the system may have already retrieved the data from memory which is likely to be accessed by subsequent read requests. To accommodate this pre-fetching feature, the access request logic 24 is directly coupled to read buffer 29. So, when a read request is received by the access request logic 24, the access request logic 24 first checks the read buffer 29 to see if the requested data has already been read (pre-fetched) from memory. If it has, a memory access is not required and the data can be immediately read from the read buffer 29 thereby enhancing performance. If not, then the request is queued for execution in memory 14 as per normal. As one skilled in the art will appreciate, although pre-fetching may require more complex logic to retrieve and manage the additional data read from memory and stored in the read buffer, such pre-fetching can significantly enhance system performance.

Ultimately, queuing the memory access requests in the system 20 allows the IDADs to make use of idle time spent waiting for data from the shared memory 14 by letting the IDAD perform other functions (such as processing new access requests) while previous access requests are being executed. The actual queuing of memory access requests in the queue 26 may be managed in a variety of ways so long as the access requests are executed on a first-in first-out ("FIFO") basis, that is, the oldest access request in the queue is executed next. If the access requests are not executed in the order they are received, there would be a potential for corruption of the data in the memory. The depth and width of the queue can be programmable or parameterizable to accommodate the desired number of access requests which may be enqueued (i.e., the depth of the queue) and the number of data, address, and control bits to be queued for each access request (i.e., the width of the queue). A single queue can be used for all memory access requests from the IDADs 12 or separate queues can be configured for requests from each IDAD 12. Obviously, if separate queues are going to be used, the order of the memory access requests would need to be maintained to ensure proper execution in memory and thus memory data integrity. As one skilled in the art will appreciate, tracking the order of the memory address requests can be accomplished in several ways including embedding control or identification bits in the requests or by maintaining a separate ordering queue to track the order of the requests received (and/or which IDADs requested) and thus control the order the requests will be executed in memory.

It should be noted that a change in the memory 14 of system 20, which in turn changes the required protocol to access the memory 14, only requires a change to the memory access logic 28. Since the memory access logic 28 handles the interface to the memory 14, instead of each IDAD 12 interfacing with the memory 14, a change in memory protocol only requires a change to the memory access logic 28 instead of having to change each IDAD 12. By designing flexible memory access logic 28 to accommodate varying timing requirements, data/address formatting, etc., the memory access logic 28 may be defined to easily handle a change in memory 14. Thus, the system 20 would be more flexible since memory changes could be implemented more efficiently.

FIG. 3. shows a system diagram of a specific embodiment of the queued memory access system 30 of the present invention. The system 30 shown in FIG. 3 is largely the same as the system 20 shown in FIG. 2. The system 30, however, includes a Digital Signal Processor IDAD ("DSP IDAD") 32 in addition to the other IDADs 12 of the system. The DSP IDAD 32 is not coupled to the queue 26 via the access request logic 24 like the other IDADs 12, however, but is instead coupled more directly with the shared memory 14 via the memory access logic 28. This is to give priority to memory access requests from the DSP IDAD 32. In particular, a memory access request from the DSP IDAD 32 goes directly to memory access logic 28 to be immediately, or as quickly as possible, executed in memory 14. Specifically, requests from the DSP IDAD 32 bypass the queue 26 and are executed before the next queued access request of the other IDADs 12. In many systems incorporating a DSP, any waiting experienced by the DSP is likely to directly affect system performance. Accordingly, designing the system to give immediate priority to the DSP may be necessary to avoid deleterious effects on system performance. The system 30 of FIG. 3 illustrates that such priority can be granted to the DSP 32 while also incorporating the queued memory access system 22 for the memory access requests of other IDADs 12 as contemplated by the present invention. Accordingly, the memory access system and method of the present invention contemplates and can accommodate queuing, and executing in memory, the memory access requests from a single IDAD or from multiple IDADs (whether all of the requests from the IDADs' are directed to a queue—or whether some of the IDADs' are queued while others are not). Moreover, the queue 26 may be flushed of all access requests when a write request is placed in the queue 26, such that a read request from the DSP IDAD 32 which is given priority will be ensured updated data from the shared memory 14.

FIG. 4 shows more detail of the queue and memory structure used by applicant for the specific embodiment 40 of the present invention illustrated in FIG. 3. The portion of the embodiment 40 as shown in FIG. 4 comprises the queue 26, the shared memory 14, the memory access logic 28, and the DSP 32. The queue 26 and DSP 32 are coupled to the memory access logic 28. The memory access logic is coupled to the shared memory 14. The memory access requests from the queue 26 and the DSP 32 are sent to the memory access logic 28 for execution in memory 14.

As shown in FIG. 4, the queue 26 comprises n-number of banks of flip-flops $Q_0$–$Q_n$ 41, each bank having m-number of flip-flops. For purposes of this description, the term flip-flop as used herein will include a single flip-flop as well as a bank of flip-flops. For illustrative purposes, FIG. 4 shows a single flip-flop in each bank, while the signals between each flip-flop are shown to include m-number of signals flowing between the flip-flops (representative of the m-number of flip-flops). The banks of flip-flops 41 are coupled together via input multiplexers 42. The outputs of the banks of flip-flops $Q_1$–$Q_n$ are coupled to the input of the next sequential bank of flip-flops $Q_0$–$Q_{n-1}$ via the input multiplexers 42. In addition, the outputs of the banks of flip-flops $Q_1$–$Q_n$ are fed back to their own inputs via the input multiplexers 42. The outputs of banks $Q_0$ and $Q_1$ are coupled to the queue output multiplexers 46, (note a single multiplexer is shown because only one flip-flop in each bank is shown). Access request logic 24 for each flip-flop bank $Q_0$–$Q_n$ controls the input multiplexers 42 to determine which request will be loaded into the bank of flip-flops 41 on the next clock cycle. The input multiplexers 42 have three inputs from which to select the request to be loaded into the flip-flop bank 41: 1) the new request received from the IDADs, NewReq; 2) the feedback output of the flip-flop bank 41; and 3) the output of the preceding flip-flop bank 41. By selecting between these inputs, new requests (NewReq) can be loaded into any flip-flop 41 or requests can be shifted in the queue to the following flip-flops 41. The access request logic 24 uses three input signals to control this selection process via the input multiplexers 42: the Enable signal, the Valid [0–n] signal(s), and the Done signal. The Enable signal indicates that a new request has been received from the IDADs and needs to be loaded into the queue. The Valid [0–n] signal indicates that particular flip flop bank 41 contains valid information. Empty flip flop banks are eligible for replacement when a new load request is signaled through NewReq. For example, assume that there is one valid entry in the queue. If the Enable signal is active (indicating a new request is to be loaded into the queue), the access request logic 24 will control the multiplexers for Q1 to select the new request, NewReq. Basically, the empty flip flop bank that is closest to the front of the queue is filled first, as determined by the Valid signals.

The Done signal is generated by the memory access logic 28 to indicate when a request from the queue 26 has been successfully executed in memory. The Done signal is used by the access request logic 24 to indicate whether the requests should be shifted in the queue 26. More specifically, the access request logic 24 uses the Done signal to determine if the flip-flop banks 41 should re-load their previous output via the feedback to input multiplexers 42, or if they should load the outputs of the preceding flip-flop bank 41 thereby shifting the requests in the queue 26 to the following flip-flop bank 41. Obviously, if a queued request has been executed in memory, then the remaining requests should be shifted. Thus, if the Done signal is active, the access request logic 24 controls the input multiplexers 42 to select the outputs of the preceding flip-flop bank 41 for loading on the next clock edge—and the queue 26 is shifted. If the Done signal is not active, the access request logic 24 controls the input multiplexers 42 to select the flip-flop bank's 41 own feedback output for loading on the next clock edge—and the queue 26 is not shifted.

The output multiplexer 46 selects which request in the queue is sent to the memory access logic 28 for execution. The output multiplexer 46 is controlled by the Done signal which is generated by the memory access logic 28 when a request from the queue has been successfully executed in memory. If Done is not active, the output multiplexer 46 selects the output of $Q_0$ to be output from the queue 26, and the request pending in $Q_0$ is provided to the memory access logic 28 for execution. If, however, a queued request has been executed in memory 14 during the previous clock cycle, and the Done signal is therefore active, the output multiplexer 46 selects the output of $Q_1$ to be output from the queue 26, and the request pending in $Q_1$ is provided to the memory access logic 28 for execution. In this manner, the next request in the queue 26 can be executed immediately, with no wait states for the next request to be shifted into $Q_0$. Without the output mux 46, a first request would be executed from $Q_0$ in the queue 26, the Done signal would go active, however, the queue would have to wait a clock cycle to shift the next request into $Q_0$ before it could be output from the queue 26. By using the Done signal to simultaneously (i.e., in the same clock cycle) shift the queue 26 and control the output multiplexer 46, requests from the queue 26 can be provided to the memory access logic 28 for execution in memory 14 on successive clock cycles.

In this embodiment of the queue 26, the number of flip-flop banks (n) determines the number of entries/requests that can be stored in the queue 26, i.e., the depth of the queue 26. The size of the requests, i.e., the number of flip-flops per bank determines the number of bits available to accommodate the request data, address, and control bits (if any), which in turn determines the width of the queue 26, represented by the letter "m" in the figure. The size of the queue 26 can be parameterizable, i.e., set by parameters, or programmable. It is understood that a read request to be queued will comprise address bits and perhaps control bits specifying the requesting IDAD. A write request to be queued will comprise address bits, data bits, and perhaps control bits identifying the requesting IDAD. If requests from a single IDAD are being queued, obviously the identification control bits would not be required. Control bits may also be used to specify whether the memory access request is a read or a write request.

In this embodiment 40, the memory access logic 28 selectively executes the memory access requests from the queue 26 and the DSP 32, and the requests from the DSP 32 are always given priority over the requests from the queue 26. The memory access logic 28 in this embodiment 40 comprises a control mux 47, chip select logic 48, and a done flip-flop 49. The memory access requests from the queue 26 and the DSP 32 are coupled to the control mux 47 and chip select logic 48. The chip select logic 48 generates a DSP__CS signal to the control mux 47 to select which request is provided for execution in memory. Since the DSP 32 is always given priority, a request from the queue 26 is only executed in memory 14 when no DSP 32 request is asserted. Therefore, the DSP__CS signal is used to control mux 47 to provide the DSP 32 request for execution in memory 14, unless no DSP 32 request is pending. If no DSP 32 request is pending, the control mux 47 selects the queued requests for execution in memory 14. When a request from the queue 26 is executed in memory 14, the chip select logic 48 generates the Done signal which is latched via the done flip-flop 49. The output of the done flip-flop 49 is coupled back to the access request logic 24 and queue output mux 46 for the shifting and control purposes discussed above. The chip select logic 48 generates the chip select signal, CS, to memory 14 and handles the necessary memory timing and protocol. If the request is a read request, the data read is output via RDATA to a read buffer 29 (not shown in FIG. 4).

FIG. 5 shows a timing diagram illustrating the behavior of system signals during execution of several access requests and access completions as contemplated by the present invention. As indicated by the Control signal in FIG. 5, the IDADs assert memory access request A, pause for a clock cycle, and then assert requests B, C, D, and E on successive clock cycles. Request A has executed in memory two clock cycles later as indicated by the Done signal. The first clock cycle is used to load request A into the queue. On the second clock cycle, request A is executed and the Done signal is activated. On the same clock cycle as request A's Done, request B is asserted by the IDADs. On the next clock cycle, request B is loaded into the queue, and request C is asserted by the IDADs. On the next clock cycle, request B is executed, request C is queued, and request D is asserted by the IDADs. Similarly, on the next clock cycle, request C is executed, request D is queued, and request E is asserted by the IDADs. Continuing, on the next clock cycle, request D is executed, and request E is queued. On the next clock cycle, request E is executed.

FIG. 6 shows a timing diagram illustrating the behavior of system signals during execution of several access requests and access completions for the embodiment of the present invention as contemplated in FIG. 4. In the embodiment of the invention in FIG. 4, memory access requests from the DSP are given priority over queued requests from other IDADs. Similar to FIG. 5, FIG. 6 illustrates IDADs asserting memory access request A, pausing for a clock cycle, and then asserting requests B, C, D, and E on successive clock cycles, as shown via the Enable signal. In addition, however, the DSP asserts a memory request in the same clock cycle as Request B from the queue is being executed, see the DSP chip select signal, DSP_CS. As a result, in the following clock cycle, Request C from the queue is not executed and the DSP request is executed instead. Thus, Request C is effectively delayed a clock cycle while the DSP request is executed. Once the DSP request has been serviced, however, the remaining queued requests can be executed in successive clock cycles. Thus, the DSP can be given priority while still incorporating the advantages of queuing the other IDAD access requests.

The above discussion is meant to be illustrative of the principles and various embodiments of the present invention. While the invention has been particularly shown and described with respect to specific embodiments thereof, numerous variations and modifications will become apparent to those skilled in the art once the above disclosure is fully appreciated. It is intended that the following claims be interpreted to embrace all such variations and modifications.

What is claimed is:

1. A memory access system, comprising:
   access request logic having an interface to accept memory access requests from an independent data access device (IDAD);
   a queue coupled to said access request logic;
   memory access logic coupled to said queue; and
   a processor coupled to said memory access logic;
   wherein said access request logic places memory access requests in the queue and said memory access logic executes memory access requests from the queue in memory, and wherein the memory access logic handles protocol required to interface to memory so the IDAD is not required to do so; and
   wherein said processor is coupled to said memory access logic such that memory access requests by said processor are not queued and are given priority, by the memory access logic, over memory access requests by other IDADs in the system.

2. The memory access system of claim 1 wherein the depth of the queue is parameterizable so the queue can accept a programmable number of memory access requests.

3. The memory access system of claim 1 wherein the width of the queue is parameterizable so the queue can accept memory access requests comprising a programmable number of bits.

4. The memory access system of claim 1 wherein the interface to said access request logic comprises a bus interface.

5. The memory access system of claim 1 wherein the memory access logic is flexibly designed to handle a change in the required protocol to interface to memory.

6. The memory access system of claim 1 wherein the memory access logic generates a Done signal to indicate that a memory access request from the queue has been executed in memory.

7. The memory access system of claim 6 wherein the Done signal generated by the memory access logic is coupled to the queue to accommodate shifting the queue to the next queued request.

8. The memory access system of claim 1 wherein the memory access logic is capable of pre-fetching data when a read request is executed.

9. The memory access system of claim 1 wherein said memory access logic performs pre-fetching by reading a plurality of additional addresses from said memory relating to the address of the read access request.

10. The memory access system of claim 1 wherein the access request logic allows the IDAD to take advantage of write-posting, where the IDAD write requests are taken by the access request logic to be queued and executed in memory while the IDAD is freed to perform other functions.

11. The memory access system of claim 1 wherein said access request logic accepts memory access requests from a plurality of IDADs.

12. The memory access system of claim 11 wherein control bits are embedded in the queued memory access requests to identify the IDAD that made the request.

13. The memory access system of claim 11 wherein the access request logic places the memory access requests of each IDAD in a separate queue.

14. The memory access system of claim 13 wherein the memory access logic uses an ordering queue to control the order the memory access requests are executed in memory.

15. The memory access system of claim 1 further comprising a read buffer coupled to the memory access logic and having an interface for an IDAD to access the contents of the read buffer.

16. The memory access system of claim 15 wherein the memory access logic executes memory access requests from the queue in the memory and places the data retrieved from memory during a read request in said read buffer.

17. The memory access system of claim 11 wherein a separate read buffer is used for each IDAD in the system which is configured to submit access requests to the memory.

18. The memory access system of claim 1 wherein memory interface protocol can be changed simply by changing the protocol used by the memory access logic.

19. The memory access system of claim 1 wherein the queue is flushed of all access requests when a write request is placed in the queue, such that a read request from the processor which is given priority will be ensured updated data from the memory.

20. The memory access system of claim 15 wherein the access request logic is coupled to the read buffer such that when the access request logic receives a read request, the access request logic first checks the read buffer to determine if the requested data is already present in the read buffer.

21. The memory access system of claim 1 wherein the memory access logic is coupled to the queue to accept queued memory access requests from a plurality of the queue's locations so there is no wait state when executing consecutive queued memory access requests.

22. A method of accessing shared memory, comprising:
   accepting memory access requests from an independent data access device (IDAD);
   placing the memory access requests in a queue;
   executing the memory access requests from the queue in shared memory with memory access logic configured to handle protocol required to interface to the shared memory so the IDAD is not required to do so; and
   giving priority to memory access requests from a system processor over memory access requests of other IDADs in the system;
   wherein the memory access requests from said system processor are not placed in said queue with the memory access requests of other IDADs from the system.

23. The method of claim 22 wherein the memory access requests are accepted from the IDAD via a bus.

24. The method of claim 22 further comprising generating a Done signal when a memory access request is executed in memory, and using the done signal to shift the memory access requests in the queue.

25. The method of claim 24 wherein the memory access requests can be executed in consecutive clock cycles with no wait states.

26. The method of claim 22 further comprising pre-fetching data from additional addresses in memory where the addresses are related to the address of an executed read request.

27. The method of claim 22 further comprising write-posting wherein write requests are accepted from an IDAD to be queued and executed in memory while freeing the IDAD to perform other functions.

28. The method of claim 22 comprising placing data read from memory in a read buffer after executing a read request.

29. The method of claim 28 comprising an IDAD reading data from the read buffer.

30. The method of claim 26 comprising placing data from additional addresses obtained during pre-fetching in a read buffer.

31. The method of claim 22 flushing all memory access requests in the queue when a write request is placed in the queue, such that a read request from the processor which is given priority will be ensured updated data from the shared memory.

32. A memory access system, comprising:
   shared memory;
   means for accepting memory access requests from independent data access devices (IDADs);
   means for queuing said memory access requests, coupled to said means for accepting memory access requests;
   means for executing said memory access requests in the shared memory, wherein the executing means handle protocol required to interface to the shared memory so the IDADs are not required to do so;
   means for storing data read from shared memory during execution of said memory access requests such that said data is available to IDADs, coupled to said means for executing said memory access requests; and
   said executing means further comprising:
      means for accepting unqueued memory access requests from a processor;
      means for prioritizing said unqueued memory access requests from said processor over said memory access requests from said queueing means; and
      means for executing said unqueued memory access requests from said processor before executing said memory access requests from said queueing means.

33. A memory access system, comprising:
   access request logic having an interface to accept memory access requests from an independent data access device (IDAD);
   a queue coupled to the access request logic, wherein a dimension of the queue is parameterizable so the queue can accept a programmable number of memory access requests;
   memory access logic coupled to the queue; and
   a processor coupled to said memory access logic;
   wherein the access request logic places memory access requests in the queue and the memory access logic executes memory access requests from the queue in memory; and
   wherein said processor is coupled to said memory access logic such that memory access requests by said processor are not queued and are given priority, by the memory access logic, over memory access requests by other IDADs in the system.

34. The memory access system of claim 33 wherein the dimension is a depth of the queue.

35. The memory access system of claim 33 wherein the dimension is a width of the queue.

* * * * *